Figure 1:
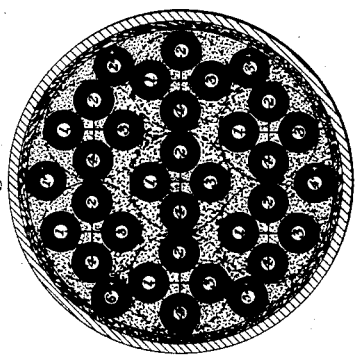

(No Model.)

S. F. SHELBOURNE.
ELECTRIC CABLE.

No. 343,676. Patented June 15, 1886.

Attest:
Raymond F. Barnes
H. P. Bush

Inventor:
Sidney F. Shelbourne

UNITED STATES PATENT OFFICE.

SIDNEY F. SHELBOURNE, OF NEW YORK, N. Y.

ELECTRIC CABLE.

SPECIFICATION forming part of Letters Patent No. 343,676, dated June 15, 1886.

Application filed April 1, 1885. Serial No. 160,962. (No model.)

*To all whom it may concern:*

Be it known that I, SIDNEY F. SHELBOURNE, a citizen of the United States, residing in the city of New York and State of New York, have invented a new and useful Improvement in Electric Cables, a particular description of which, to enable others to understand and apply the invention, is hereinafter set forth.

In United States Patent No. 297,177, heretofore granted to me, I have shown a cable composed of a series of strands of insulated conductors of two or more wires in each strand, the wires being formed in helices about each other in each of the strands, and the strands themselves in like helices and in series about a central core or strand of the cable. In that patent regard was had to the diminishing of induction by making the strands adjacent to each other in any series or layer of opposite spirals, the case being one adapted to the employment of single conductors in connection with ground-circuits.

The present invention relates to a modification of the strands as shown in said former patent, by which the insulated conductors forming with each other pairs as metallic circuits will be constituted together as a whole in such a manner that each limb of each circuit will be equidistant from the two wires of any other circuit in the same cable; and, further, the present invention relates to the utilization of the spaces between the converging circles of adjacent strands upon the outer contour of the cable by disposing in each of such spaces a separate insulated conductor and connecting these separate conductors with each other in such a manner as metallic circuits that the resultant of the electric inductive action of each of such circuits will be a balance between the two directions of the current upon each and every other circuit in the same cable.

To accomplish the first part of the invention, four insulated conductors are selected and helixed about each other and form the core of the cable. About this core are helixed six strands of similar conductors, each strand composed of four insulated conductors helixed about each other in a manner identical with that of the core of the cable. The wires of each strand, as well as those of the core of the cable, are then numbered in succession from left to right or right to left around the strands, the numbers in each strand being 1 2 3 4. If the whole length of cable is composed of more than one section or division, care must be observed in joining the sections together to have all the wires in any strand of one section joined with the wires of any one strand in a succeeding section by identical numbers in the two sections, and so throughout the whole length of the cable, no matter of how many sections it may be composed. At both the remote ends of the working-cable the wires of each strand are electrically joined together diametrically with each other—that is to say, number two and number four wires are connected with each other, and also number one and number three wires, and in the same manner with the wires composing the core of the cable.

The inductive disposition of the separate conductors occupying the converging spaces in the outer contour of the cable is not apparent when the whole cable is composed of only one section. Usually, however, a cable is composed of several or many sections and extends as many miles. In such cases the separate conductors are paired with each other diametrically across the cable, the two wires of each pair crossing each other, and taking positions the one that of the other at each connection of the sections of the cable, and therefore in each successive division thereof. The result of this disposition of the separate wires is that in each circuit composed of the diametrically-arranged wires the outgoing current flows along one side of the cable for a given distance (the length of one section) and at the same time the return-current flows for an equal distance on the same side of the cable in the adjoining section. Thus the inductive effect is neutralized. It is evident that the most perfect result is produced when an even number of equal sections are used. The equidistant relation of both limbs of each of the strand-circuits to the average line in space within the cable of the limbs of all the other circuits, and therefore the balance between opposite inductive energies of each circuit upon all the others, must be left to the thought and observation of the practical experimenter with such a cable, and cannot be made comprehensible in brevity with words. The practical construction, however, of the cable, the arrangement of its strands, and the connection of their wires, as well as the disposition and connection of the separate conductors in the contour spaces, will be best illustrated in the figures of the drawings, like letters and numerals referring to like parts in each of the figures.

Figure 1 is an enlarged sectional view of the cable, showing the relative position of the strands to the core and separate conductors in the contour spaces, and also showing the electrical connections of the strand and core conductors in their several strands. The separate conductors are shown in Fig. 1 as numbered from $1^+$ to $6^+$. As to these conductors $1^+$ is paired with $4^+$, $2^+$ with $5^+$, and $3^+$ with $6^+$, at the ends of the cable, and the limbs of each pair cross and occupy each the position of the other at every successive junction or connection of the sections of the cable.

Figure 2:
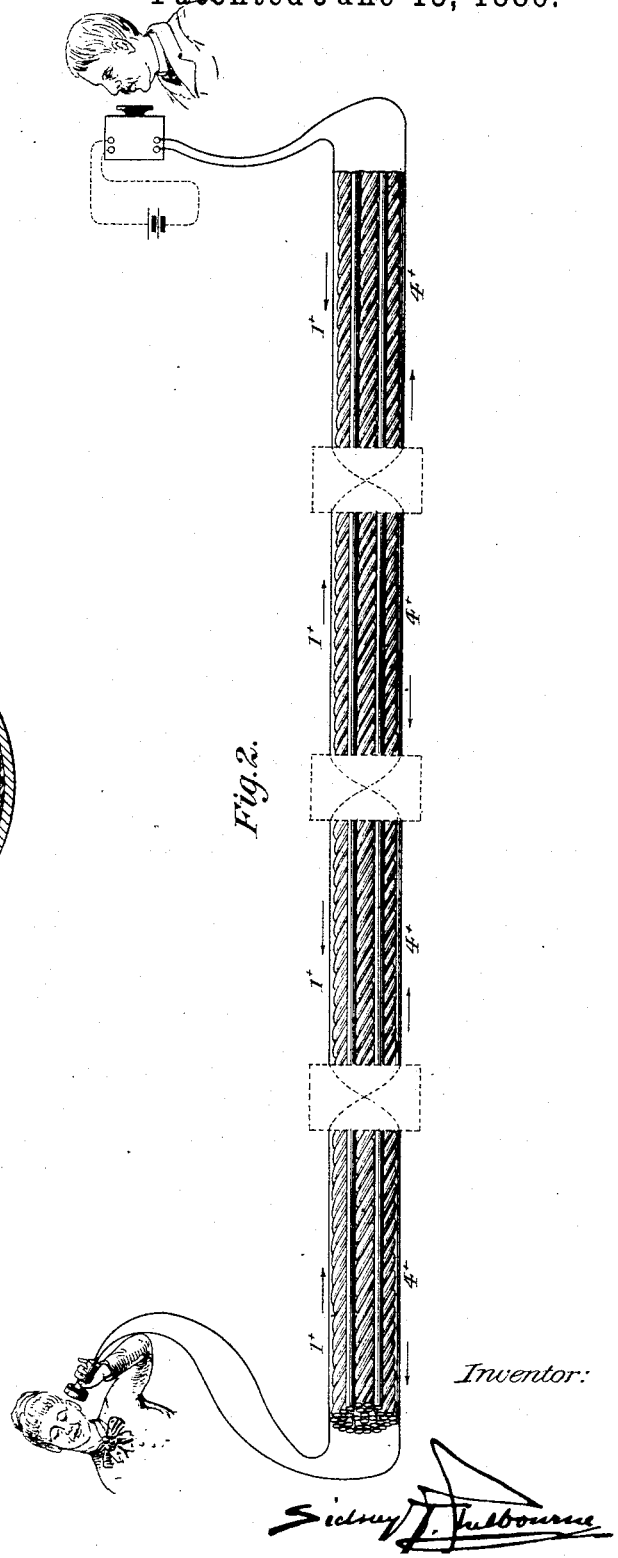

The position, connection, and operation of the separate conductors diametrically paired are clearly shown in Fig. 2, which is a longitudinal perspective of one-half of the cable, or rather of the three strands of it nearest to the observer. In this figure separate conductors $1^+$ and $4^+$ are shown connected with a telephone-transmitter at one end of the cable and with a vocal receiver or audiphone at the other end. The crossing of these conductors at the junctions of the sections of cable enable us to trace the opposite directions of the same current on the same sides of the cable by the directions of the arrows in the figure, and thus to observe that the inductive effect of each limb of the circuit upon the strands of the cable are self-balanced in the active circuit itself.

The braiding or wrapping and outer protection of the cable is provided for in the usual manner by water-proof coating or a jacket of lead.

Having thus clearly described my invention, what is claimed as new is—

1. A series of strands for an electric cable, each composed of four separately-insulated conductors formed into a helix about each other, and combined in pairs electrically within the same strand by the connection at the ends of the cable of the two conductors diametrically opposite to each other in said strand, substantially as herein described.

2. An electric cable formed of strands of four conductors each, said strands arranged helically about one of their number, constituting the core of the cable, and each strand connected with its successor in progression between the sections in length of the cable by the union of wires of identical position and number in the same strand or lineal succession of strands, as set forth.

3. In an electric cable, the combination of strands of four insulated conductors helixed about each other with separate single conductors arranged in the converging spaces between the strands in the contour of the cable, substantially as described.

4. The combination of the separate conductors $1^+$ to $6^+$ each in pair with its opposite diametrically across the cable, the limb of each member of the pair combined in circuit being interchanged with that of the other at the junctions of the sections of the cable, as and for the purpose set forth.

5. Quadruplex strands of insulated conductors and separate single conductors in combination with each other in such relative position that the single conductors occupy the converging spaces between the strands on their outer contour when assembled, the whole forming together an approximately cylindrical cable, said single conductors being crossed and recrossed each to an opposite side of the cable in its several sections alternately, substantially as shown and described.

In witness whereof I have subscribed my name hereto in presence of two witnesses.

SIDNEY F. SHELBOURNE.

Witnesses:
GEO. L. WEED,
H. P. BRUSH.